(No Model.)

E. H. COLE.
STUFFING BOX.

No. 344,816. Patented July 6, 1886.

Witnesses:
L. E. Hoffman
A. Conant

Inventor:
Edward H. Cole
By his atty
James E. Boyce

UNITED STATES PATENT OFFICE.

EDWARD H. COLE, OF BROOKLYN, NEW YORK.

STUFFING-BOX.

SPECIFICATION forming part of Letters Patent No. 344,816, dated July 6, 1886.

Application filed May 10, 1886. Serial No. 202,639. (No model.)

*To all whom it may concern:*

Be it known that I, EDWARD H. COLE, of Brooklyn, in the county of Kings and State of New York, have invented a certain new and useful Improvement in Stuffing-Boxes, of which the following is a specification.

The packing inclosed in the stuffing-box performs its function of preventing the leakage of steam or other fluid while allowing the valve-stem or other rod to be moved. Its successful operation depends on the capacity for nice adjustment. The stuffing-box should compress the packing just sufficiently to maintain the requisite tightness without inducing excessive friction or wear. It is important when the proper adjustment is attained that it be not disturbed at all until gradual wear shall necessitate a slight tightening to further compress the packing.
This invention overcomes a difficulty incident to that class of stuffing-boxes which open and close by a turning motion of the gland or cover when applied to valve-stems or other rods which operate by a turning motion.
Some of the packings which are otherwise eminently adapted to their purpose have a tendency to stick to adjacent surfaces. When the stem of a screw-valve or other rod operating by a turning motion is allowed to remain unused for a considerable time, or even under some circumstances for a few days, the packing is liable to adhere with considerable force to the stem. When thus conditioned, the operator turns the stem to operate the valve, the packing is liable to turn with it, and in case it also adheres to the cap of the stuffing-box it is liable to turn the latter and relax the pressure on the packing. I overcome the difficulty by locking the packing so firmly to the stationary part below the cap that under such conditions the packing will be certain to remain stationary, instead of turning with the valve-stem. It is mainly essential to guard against the packing turning with the valve-stem in the direction to unscrew the cap. I consequently fortify mainly against the turning of the packing in that direction. I have devised very simple means for attaining the end desired. It consists in notching the bottom of the stuffing-box. I give the notches an inclination in the direction to resist most effectually the unscrewing motion.

The accompanying drawings form a part of this specification, and represent what I consider the best means of carrying out the invention.

Figure 1:
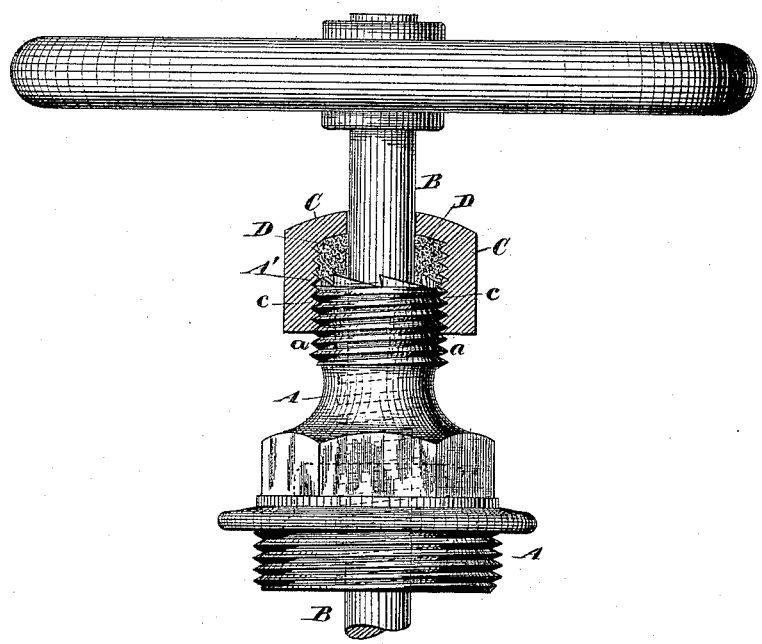
Figure 2:
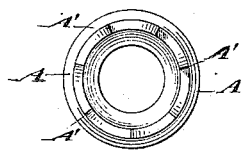
Figure 3:
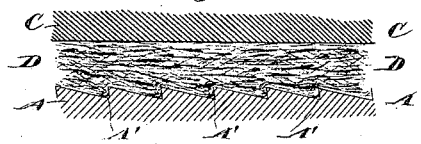

Figure 1 is an elevation, partly in section. Fig. 2 is a plan view of the stuffing-box with the cap removed. Fig. 3 is a diagram showing the packing and the adjacent portions above and below projected as a plane. This shows very clearly the smooth top of the stuffing-box and the notched bottom with the inclination of the notches in the direction to guard against the unscrewing motion.

Similar letters of reference indicate corresponding parts in all the figures where they occur.

A is the portion of the stationary part of the steam-valve. It is provided with screw-threads on the interior, (not represented,) which engage with corresponding screw-threads on the valve-stem B. The portion of the latter which extends up through the stuffing-box is smooth. On the exterior of the part A, near the top, are screw-threads $a$, which engage with corresponding internal screw-threads, $c$, formed in the cap C. All the screw-threads are "right-handed." The upper portion of the interior of the cap C is smooth.
The opposite surface, the upper edge of the part A, which applies against the bottom of the packing, is notched, as indicated by A'. These notches are inclined in the direction to resist the turning of the packing with the stem B when the latter is turned in the direction to unscrew. The packing is marked D, and may be cotton or other fibrous material, either plain or compounded with india-rubber or other substance. It is important either that it be of a character sufficiently plastic to mold itself at least partially to the notches A', or that it be so manufactured, when of metal or other less plastic material that it shall have such notches partially or completely formed before its introduction into the stuffing-box. It is essential that the packing, when in use, shall match to the notches A', so as to be held thereby against a turning motion. The packing is adjusted by turning down the cap C to compress the packing in the ordinary manner. The packing may adhere with any degree of force to the stem and to the other parts without inducing mischief. The notches A' hold the packing with such firmness that it cannot be revolved. It may adhere to the stem with any degree of force, but it cannot be turned thereby. The turning of the stem B in either direction, especially in the direction to unscrew, is certain to disengage the stem promptly from the packing, and the packing instantly commences to perform its ordinary function of simply maintaining a tight and easy joint around the stem without any injurious tendency to unscrew the cap.

Modifications may be made in the forms and proportions. Ordinarily there will be screw-threads on the stem engaging with other corresponding screw-threads (not represented) in the interior of A, which will induce a more or less rapid end movement of the stem simultaneously with its turning movement. In this case it is common to make the screw-threads on the stem much quicker or of longer pitch than the screw-threads $c$; but this is not material.

I believe that my invention will overcome all the difficulties heretofore experienced from the tendency of the cap to turn with the stem.

I claim as my invention—

In a stuffing-box, the notches A' on the interior part, adapted to engage with the packing and prevent any turning motion of the latter, substantially as herein specified.

EDWARD H. COLE.

Witnesses:
HENRY L. FULLER,
JAMES C. HORN.